US008872494B2

(12) United States Patent
Hirakawa

(10) Patent No.: US 8,872,494 B2
(45) Date of Patent: Oct. 28, 2014

(54) SEMICONDUCTOR INTEGRATED CIRCUIT DEVICE, DC-DC CONVERTER, AND VOLTAGE CONVERSION METHOD

(75) Inventor: Takuya Hirakawa, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 116 days.

(21) Appl. No.: 13/597,164

(22) Filed: Aug. 28, 2012

(65) Prior Publication Data

US 2013/0207631 A1     Aug. 15, 2013

(30) Foreign Application Priority Data

Feb. 10, 2012  (JP) .................................. 2012-027122

(51) Int. Cl.
    *G05F 1/00*  (2006.01)
(52) U.S. Cl.
    USPC ............................ 323/282; 323/283; 323/284
(58) Field of Classification Search
    CPC ....................... H02M 3/156; H02M 2001/0032
    USPC ................... 323/280–286, 271–277
    See application file for complete search history.

(56) References Cited

U.S. PATENT DOCUMENTS

| | | | | |
|---|---|---|---|---|
| 5,479,088 A * | 12/1995 | Hayakawa et al. | ............ | 323/282 |
| 6,252,441 B1 * | 6/2001 | Lee et al. | ................ | 327/141 |
| 6,531,894 B2 * | 3/2003 | Watabe | ............... | 326/82 |
| 6,895,523 B2 * | 5/2005 | Otsuka | ................ | 713/401 |
| 8,242,764 B2 * | 8/2012 | Shimizu et al. | ............... | 323/285 |
| 8,248,046 B2 | 8/2012 | Hasegawa | | |
| 2007/0216372 A1 * | 9/2007 | Weng et al. | .................... | 323/222 |
| 2009/0045791 A1 * | 2/2009 | Feng et al. | ..................... | 323/282 |
| 2009/0058467 A1 * | 3/2009 | Gong et al. | ..................... | 327/12 |
| 2009/0302820 A1 | 12/2009 | Shimizu et al. | | |
| 2009/0322299 A1 * | 12/2009 | Michishita et al. | ........... | 323/282 |
| 2010/0073042 A1 * | 3/2010 | Choi | .............................. | 327/143 |
| 2010/0213910 A1 * | 8/2010 | Chen | ............................. | 323/282 |
| 2010/0231190 A1 * | 9/2010 | Falvey et al. | ................... | 323/284 |
| 2010/0283442 A1 * | 11/2010 | Nakashima | .................... | 323/283 |
| 2010/0315054 A1 * | 12/2010 | Gan | ................................. | 323/283 |
| 2011/0115456 A1 * | 5/2011 | Tanifuji et al. | ................ | 323/283 |
| 2011/0221415 A1 * | 9/2011 | Otsuka et al. | ................. | 323/283 |
| 2012/0091981 A1 * | 4/2012 | Komiya | ......................... | 323/282 |
| 2012/0286750 A1 * | 11/2012 | Xu | ................................. | 323/282 |

FOREIGN PATENT DOCUMENTS

| | | | |
|---|---|---|---|
| JP | 2002281744 A | 9/2002 | |
| JP | 2005039907 A | 2/2005 | |
| JP | 2008236822 A | 10/2008 | |
| JP | 2009303303 A | 12/2009 | |

* cited by examiner

*Primary Examiner* — Timothy J Dole
*Assistant Examiner* — Yusef Ahmed
(74) *Attorney, Agent, or Firm* — Patterson & Sheridan LLP

(57) ABSTRACT

A semiconductor integrated circuit device is employed in a DC-DC converter that switches the voltage fed to the load depending on the PWM signal. The semiconductor integrated circuit device has an error voltage generating part, a mode setting part, an oscillation signal generating part, a pulse generating part, and a control part. The oscillation signal generating part generates an oscillation signal with a prescribed period when in the non-light-load mode, and it turns off the oscillation signal when in the light-load mode. The pulse generating part generates a pulse signal before the oscillation signal generating part generates the oscillation signal when the pulse generating part switches from the light-load to the non-light-load mode.

20 Claims, 5 Drawing Sheets

SEMICONDUCTOR INTEGRATED CIRCUIT DEVICE, DC-DC CONVERTER, AND VOLTAGE CONVERSION METHOD

CROSS-REFERENCE TO RELATED APPLICATION

This application is based upon and claims the benefit of priority from Japanese Patent Application No. 2012-027122, filed Feb. 10, 2012; the entire contents of which are incorporated herein by reference.

FIELD

Embodiments described herein relate to a semiconductor integrated circuit device, a DC-DC converter and a voltage conversion method.

BACKGROUND

A DC-DC converter works as follows: the PMOS transistor on the DC input voltage side and the NMOS transistor on the ground voltage side are alternately switched on and off to generate a DC output voltage. When a relatively small current flows in the load where the output voltage is applied, the mode becomes the "light-load mode", and both transistors are maintained in the off state, so that the power consumption of the DC-DC converter can be decreased.

However, when the current flowing in the load rises rapidly, it takes time to reset the mode from the light-load mode to the normal operational mode, and during this period the output voltage falls significantly, which is undesirable.

DETAILED DESCRIPTION

In general, the embodiments presented herein will be explained in detail with reference to figures.

According to a first embodiment, there is provided a DC-DC converter, a semiconductor integrated circuit device for implementing the DC-DC converter, and a voltage conversion method that can output a stable voltage.

The embodiment provides a semiconductor integrated circuit device used in a DC-DC converter that switches a voltage fed to the load corresponding to a PWM (pulse width modulation) signal and converts an input voltage to an output voltage. The semiconductor integrated circuit device has an error voltage generating part, a mode setting part, an oscillation signal generating part, a pulse generating part, and a control part.

The error voltage generating part generates an error voltage based on a difference between a feedback voltage, which corresponds to the output voltage, and a preset reference voltage. The mode setting part sets the DC-DC converter's (hereinafter "the converter") operational mode to a light-load mode or a non-light-load mode based on the error voltage. The oscillation signal generating part generates an oscillation signal with a prescribed period when the operational mode is the non-light-load mode, and it turns off the oscillation signal when the operational mode is the light-load mode.

The pulse generating part generates a pulse signal before the oscillation signal generating part generates the oscillation signal when the pulse generating part switches from the light-load mode to the non-light-load mode. The control part controls the PWM signal based on the error voltage, the oscillation signal and the pulse signal.

Figure 1:
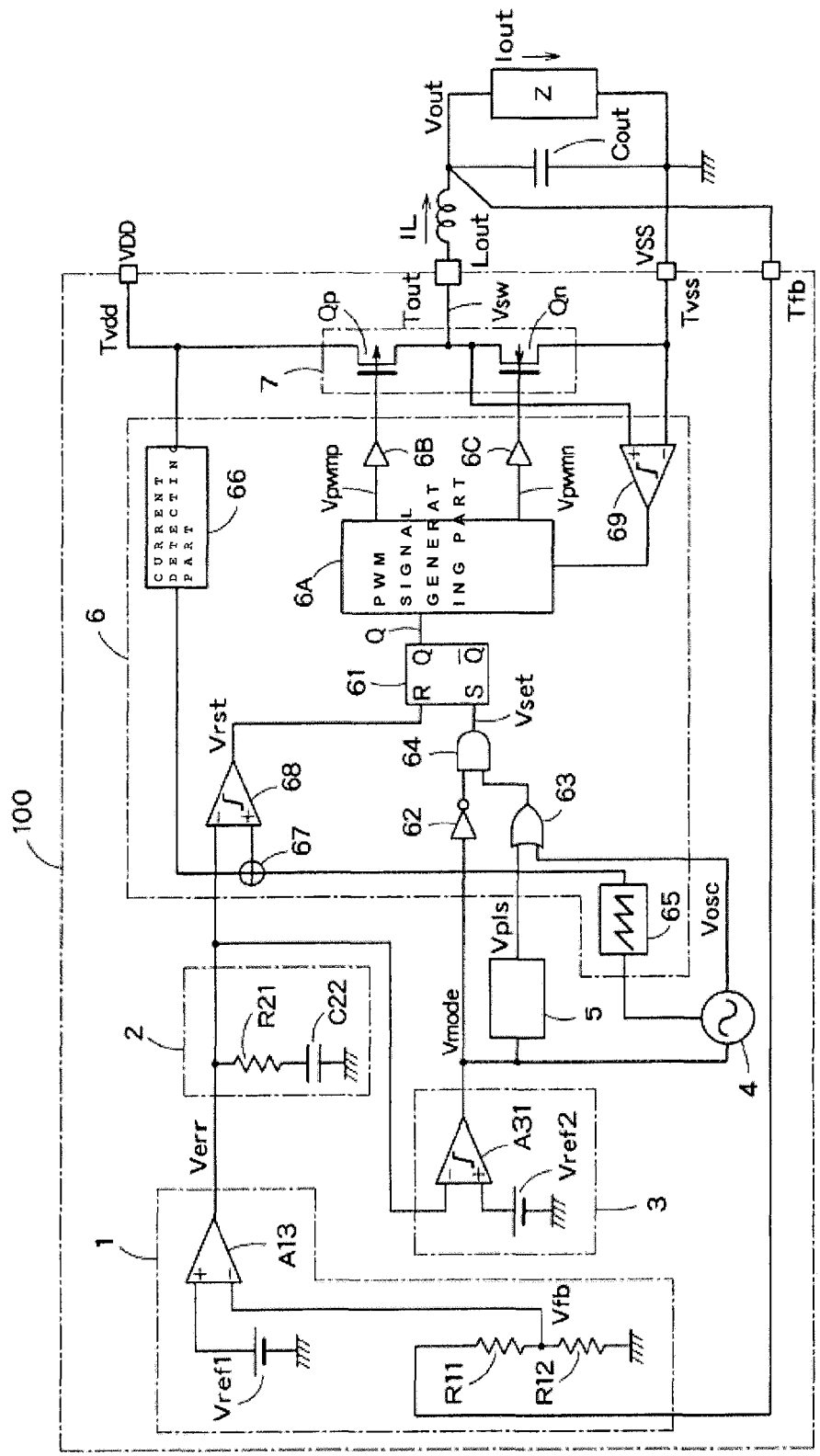
FIG. 1 is a circuit diagram illustrating a DC-DC converter according to an embodiment.

FIG. 1 is a circuit diagram illustrating the DC-DC converter according to an embodiment. This DC-DC converter is a voltage step-down DC-DC converter which generates a desired output voltage Vout such that Vout is lower than the input voltage VDD. The converter applies the output voltage Vout to the load Z. The DC-DC converter may be incorporated in mobile equipment where a low power consumption is required. In this case, an IC for controlling the mobile equipment may be connected as the load Z. Also, as example configurations, the input voltage VDD can be 3.7 V and can be provided by a lithium ion battery, and the output voltage Vout can be 1.5 V in the case where the output is used for driving the IC.

The DC-DC converter of the first embodiment may be in the form of a semiconductor integrated circuit device 100 having an inductor Lout and capacitor Cout connected between the converter's output terminal and the ground terminal. The load Z is connected at the node between the inductor Lout and the capacitor Cout, is in parallel with the capacitor, and is connected between the node and ground.

The semiconductor integrated circuit device 100 has an error voltage generating part 1, a phase compensating part 2, a mode setting part 3, an oscillation signal generating part 4, a pulse generating part 5, a control part 6, and a switching part 7. The input voltage VDD, the ground voltage VSS are input to the power supply terminal Tvdd, and the ground terminal Tvss, respectively. At the feedback terminal, Tfb, the final output voltage delivered to the load (Vout) is accessed by the integrated circuit for feedback processing.

The terminals Tvdd, Tvss are connected to the semiconductor integrated circuit device 100 as shown in FIG. 1. In practice, they are configured as the power supply terminal and ground terminal for the various parts of the device 100. Also, the output voltage Vsw of the semiconductor integrated circuit device 100 is output at the output terminal Tout of the semiconductor integrated circuit device 100.

Based on the final output voltage delivered to the load (Vout) and a preset reference voltage Vref1, the error voltage generating part 1 generates an error signal Verr. More specifically, the error voltage generating part 1 has feedback resistors R11, R12 connected in series between the ground terminal and the feedback terminal Tfb at which the final output voltage delivered to the load (Vout) is provided. It also has an error amplifier A13. The reference voltage Vref1 is input to the positive input terminal of the error amplifier A13. The feedback voltage Vfb, which is obtained by voltage division of Vout by feedback resistors R11 and R12, is input to the negative input terminal. The error amplifier A13 amplifies the difference between the reference voltage Vref1 and the feedback voltage Vfb, and also outputs the error signal Verr. The resulting error signal Verr is equivalent to an integrated difference between the feedback voltage Vfb and the reference voltage Vref. The reference voltage Vref 1 can be set based on the desired Vout.

The phase compensating part 2 has a phase compensation resistor R21 and phase compensation capacitor C22 connected in series between the error amplifier A13 output terminal and ground. Here, with a time constant corresponding to the values of the phase compensation resistor R21 and the phase compensation capacitor C22 and the amplification rate of the error amplifier A13, the phase compensating part 2 compensates the phase of the error signal Verr. The phase compensation helps to prevent oscillation in the feedback system and to maintain system stability.

The mode setting part 3 has a comparator A31. The comparator A31 is configured with a preset reference voltage Vref2 inputted to its positive input terminal, and the error signal Verr inputted to its negative input terminal. Here, the mode setting part 3 generates a mode signal Vmode that indicates whether the operational mode of the semiconductor integrated circuit device 100 is the light-load mode or the non-light-load mode. Its output of the mode signal Vmode depends on the error signal Verr. That is, when the error signal Verr is lower than the reference voltage Vref2, the comparator A31 sets the mode signal Vmode to the high level. The high level indicates that the operational mode is the light-load mode. On the other hand, when the error signal Verr is higher than the reference voltage Vref2, the comparator A31 sets the mode signal Vmode to the low level. This low level indicates that the operational mode is the non-light-load mode.

In the light-load mode, the following cycle of operation is repeated: an electric power above that needed for the load Z is applied for a certain period, and then part of the semiconductor integrated circuit device 100 is switched off for a certain period of time, thus reducing the power consumption of the DC-DC converter. On the other hand, in the non-light-load mode, switching operations are carried out continuously, and the electric power needed for the load Z is steadily supplied.

The oscillation signal generating part 4 generates the oscillation signal Vosc. Vosc is set at a high level for a prescribed period of time when the operational mode is the non-light-load mode. The oscillation signal generating part 4 turns off the oscillation signal Vosc when the operational mode is the light-load mode. The oscillation signal Vosc is used to generate the PWM (pulse width modulation) signals Vpwmp and Vpwmn. These PWM signals are then used for controlling the switching part 7 (to be explained later).

Figure 2:
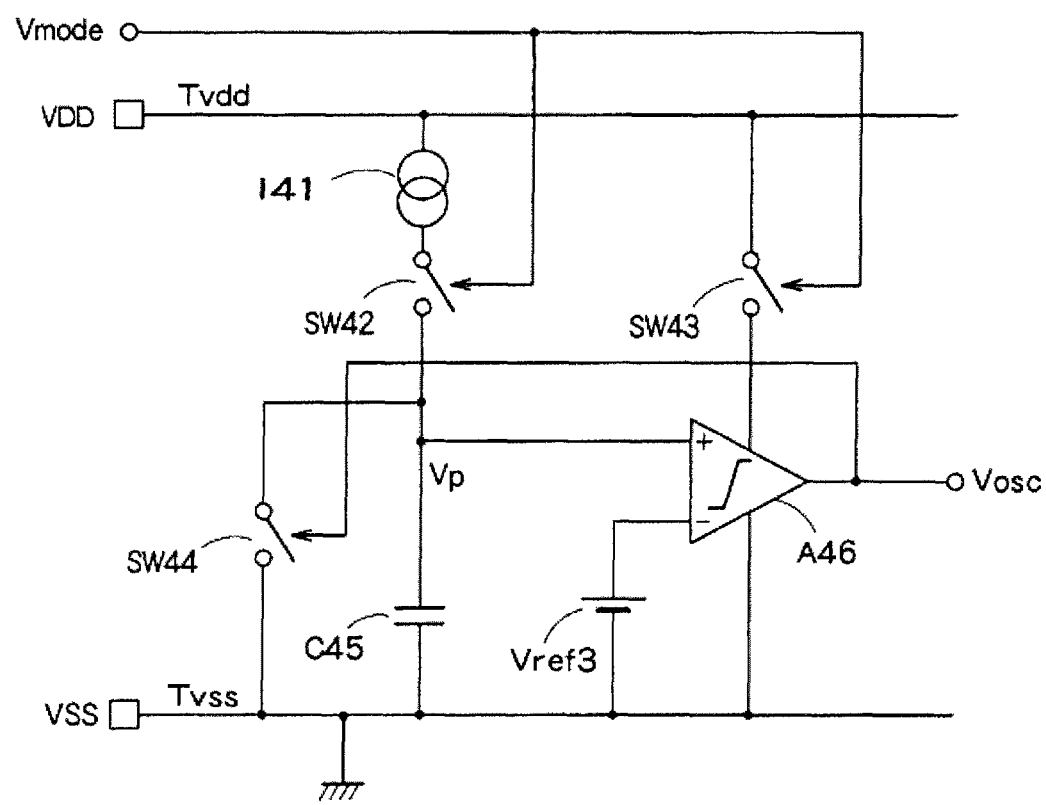
FIG. 2 is a circuit diagram illustrating an example of the oscillation signal generating part in FIG. 1.

FIG. 2 is a circuit diagram illustrating an example of the oscillation signal generating part 4. Here, the oscillation signal generating part 4 has a current source 141, switches SW42, SW43 and SW44, capacitor C45, and comparator A46.

The current source 141, switch SW42 and capacitor C45 are connected in that order between the power supply terminal Tvdd and the ground terminal Tvss. The mode signal is inputted to an input terminal of the switch SW 42 so as to control switch operations. When the mode signal Vmode is low, that is, when operating in the non-light-load mode, the switch SW42 is turned on and the current source 141 charges the capacitor C45. On the other hand, when the mode signal Vmode is high, that is, when operating in the light-load mode, the switch SW42 is turned off and the capacitor C45 is not charged.

The mode signal is also inputted to an input terminal of the switch SW 43 so as to control switch operations of that switch. When the mode signal Vmode is low, the switch SW43 turns on and the input voltage VDD is connected to the power supply terminal of comparator A46 and turns on the comparator A46. On the other hand, when the mode signal Vmode is high the switch SW43 is turned off, thereby disconnecting the power supply from the comparator A46 and causing it to turn off.

At the comparator A46, the voltage Vp at one terminal of the capacitor C45 is inputted to the positive comparator input terminal. Also, the preset reference voltage Vref3 is inputted to the negative input terminal, and the comparator outputs the oscillation signal Vosc at its output terminal. More specifically, when the voltage Vp is above the reference voltage Vref3, the comparator A46 outputs a high oscillation signal Vosc. On the other hand, when the voltage Vp is below the reference voltage Vref3, the comparator A46 outputs a low oscillation signal Vosc.

The switch SW44 is turned on when the oscillation signal Vosc is high. As a result, the voltage Vp is the ground voltage VSS in this case.

Figure 3:
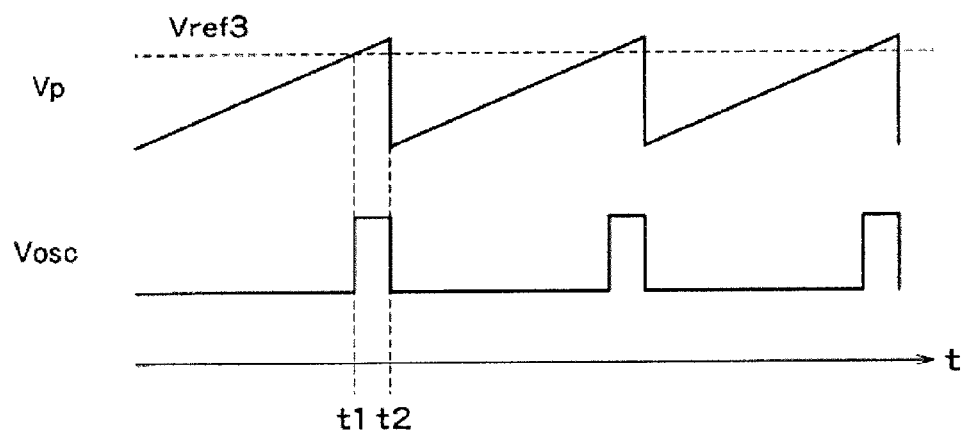
FIG. 3 is a voltage waveform diagram illustrating the operation of the oscillation signal generating part in FIG. 1.

FIG. 3 is a voltage waveform diagram illustrating the operation of the oscillation signal generating part 4 shown in FIG. 2. For FIG. 3, the abscissa represents the time and the ordinate of the upper plot represents the voltage Vp, while the ordinate of the lower plot represents the oscillation signal Vosc. In the following, we will first explain the operation when the mode signal Vmode is low (non-light-load mode).

Because the oscillation signal Vosc is low before t1, the switch SW44 is off. Consequently, the capacitor C45 is charged by the current source 141 and the voltage Vp rises. At time t1 when the voltage Vp reaches the reference voltage Vref3, the comparator A46 outputs a high oscillation signal Vosc. As a result, the switch SW44 turns on and at time point t2 the voltage Vp becomes equal to the ground voltage VSS. Consequently, the comparator A46 outputs a low oscillation signal Vosc. As evidenced by the periodicity shown in FIG. 3, an oscillation signal Vosc with a prescribed period can be generated by performing this operation repeatedly.

On the other hand, when the mode signal Vmode is high (light-load mode), the switch SW42 is off and the current source 141 does not charge the capacitor C45. The switch SW43 is also off, and the comparator A46 is off as a consequence. Consequently, the oscillation signal Vosc is fixed at the low level. Thus in light-load mode, the current source 141 is disengaged, comparator A46 is turned off and power consumption is reduced.

We now return to FIG. 1 to explain the pulse generating part 5. The pulse generating part 5 generates a pulse signal Vpls in a manner that is synchronized with the switching of the mode signal Vmode from high to low. In other words, when there is a switch from the light-load to the non-light-load mode, the pulse generating part 5 generates the pulse signal Vpls before the oscillation signal generating part 4 starts generating the oscillation signal Vosc.

Figure 4:
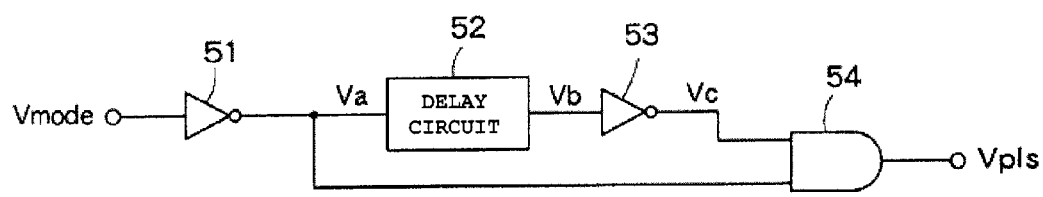
FIG. 4 is a circuit diagram illustrating an example of the pulse generating part in FIG. 1.
Figure 5:
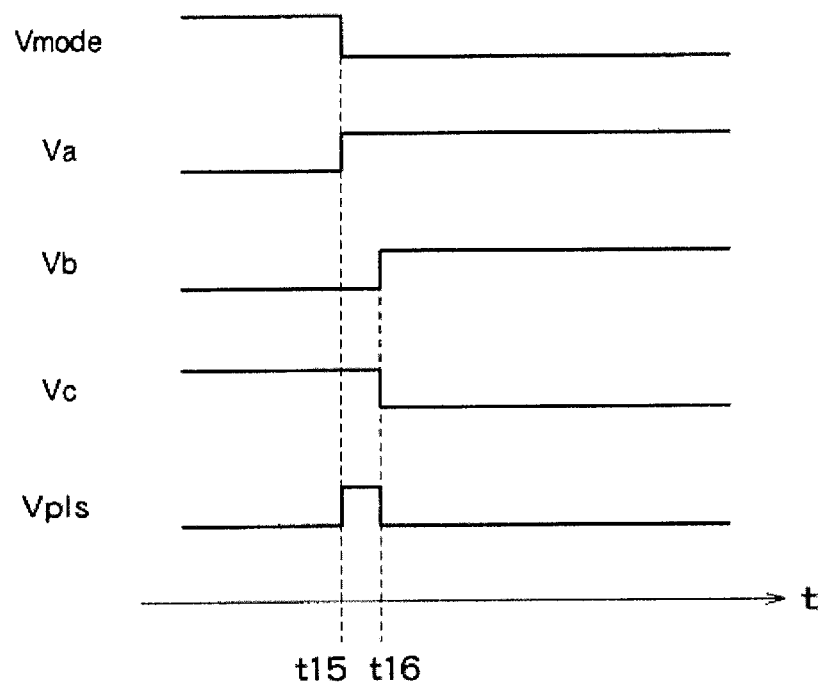
FIG. 5 is a voltage waveform diagram illustrating the operation of the pulse generating part in FIG. 1.

FIG. 4 is a circuit diagram illustrating an example of the pulse generating part 5. FIG. 5 is a voltage waveform diagram illustrating the operation of the pulse generating part 5 shown in the figure. Here the pulse generating part 5 has an inverter 51 that generates the signal Va (the first signal) by inverting the mode signal Vmode, a delay circuit 52 that generates a signal Vb (second signal) by delaying the signal Va, an inverter 53 that generates a signal Vc (third signal) by inverting the signal Vb, and an AND circuit 54 that generates the pulse signal Vpls by performing an AND operation based on inputted signals Va and Vc. As shown in FIG. 5, at time t15 when the mode signal Vmode is switched from high to low, the pulse generating part 5 sets the pulse signal Vpls to be high only once the signal Vmode has toggled. Then, at a time t16, after the delay time of the delay circuit 52 has elapsed following t15, the pulse generating part 5 sets the pulse signal Vpls low.

One of the characteristic features of the present embodiment is that when the operational mode is switched from light-load to non-light-load, the pulse signal Vpls is quickly generated, so that the load current changes drastically. Even in this case, however, a drop in the output voltage delivered to the load (Vout) still can be avoided and Vout is stabilized.

We next return to FIG. 1 to explain the control part 6 and the switching part 7. The control part 6 generates the PWM signals Vpwmp, Vpwmn. These signals have a duty ratio which corresponds to the error signal Verr. Such a configuration facilitates a steady output voltage delivered to the load (Vout). Here, the switching part 7 has a PMOS transistor Qp and NMOS transistor Qn that are connected between the power supply terminal Tvdd and ground terminal Tvss. As dictated by the PWM signals Vpwmp, Vpwmn, the transistors Qp and Qn are turned on alternately, and the voltage Vsw of the output terminal Tout is thereby controlled. We will explain this in more detail below.

The control part 6 has an RS flip-flop circuit 61, an inverter 62, an OR circuit 63, an AND circuit 64, a sawtooth wave generating part 65, a current detecting part 66, an adder 67, a comparator 68, a comparator 69, a PWM signal generating part 6A, and drivers 6B, 6C.

The inverter 62 inverts the mode signal Vmode. The OR circuit 63 computes the OR value of the pulse signal Vpls and the oscillation signal Vosc. The AND circuit 64 computes the AND value of the output of the inverter 62 and the output of the OR circuit 63 to generate the set signal Vset of the RS flip-flop circuit 61. That is, when the mode signal Vmode is high (light-load mode), the set signal Vset is held low. On the other hand, when the mode signal Vmode is low (non-light-load mode), when the pulse signal Vpls and/or the oscillation signal Vosc are high, the set signal Vset is high.

The sawtooth wave generating part 65 generates a sawtooth wave voltage with period equal to that of the oscillation signal Vosc and which is reset in synchronously with the falling edge of the oscillation signal.

The current detecting part 66 generates a current proportional to the current flowing in the switching part 7, and converts this current, which flows in an internal resistor to a voltage, so that a voltage correlated with the current IL flowing in the inductor Lout is generated.

The adder 67 adds the sawtooth voltage generated by the sawtooth wave generating part 65 and the output voltage of the current detecting part 66. The output of the adder 67 is inputted to the positive input terminal of the comparator 68, and the error signal Verr is inputted to the negative input terminal. Thus, when the error signal Verr is high, the comparator 68 sets the output to the low level, and when the output of the adder 67 exceeds the error signal Verr, the output is set high, thereby generating the reset signal Vrst for the RS flip-flop circuit 61. In this way, the transition timing of the RS flip-flop circuit 61 depends on the error signal Verr and the current IL flowing in the inductor Lout.

The RS flip-flop circuit 61 is triggered to set the output signal Q high by the rising edge of the set signal Vset, and is triggered to set the output signal Q low by the rising edge of the reset signal Vrst. As explained above, in the light-load mode, when the set signal Vset is held low, the output signal Q is also held low.

The voltage Vsw at the output terminal Tout of the semiconductor integrated circuit device 100 is inputted at the positive input terminal of the comparator 69, and ground is connected to the negative input terminal. When the voltage Vsw is high, the output of the comparator 69 is high.

Based on the output signal Q of the RS flip-flop circuit 61 and the output of the comparator 69, the PWM signal generating part 6A generates the previously-mentioned PWM signals Vpwmp, Vpwmn for controlling the switching part 7. More specifically, in the light-load mode, the output signal Q of the RS flip-flop circuit 6A is fixed low, so that the PWM signal generating part 6A stops generating the PWM signals Vpwmp, Vpwmn. As a result, the switching part 7 is turned off and the DC-DC converter operates at low power consumption.

On the other hand, in the non-light-load mode, based on the output signal Q of the RS flip-flop circuit 61, the PWM signal generating part 6A generates PWM signals Vpwmp, Vpwmn. The gates of the transistors Qp, Qn are then influenced by the buffers 6B, 6C so that the transistors Qp, Qn in the switching part 7 are alternately turned on/off in a controlled way.

However, in the non-light-load mode when the current flowing in the load Z is small, in order to prevent the current flowing in the inductor Lout from flowing back into the semiconductor integrated circuit device 100 when the output of the comparator 69 becomes high, that is, when the voltage Vsw becomes greater than the ground voltage, the PWM signal generating part 6A generates the PWM signal Vpwmn to turn the transistor Qn off.

The duty ratio is defined as the ratio of the period of the PWM signals Vpwmp, Vpwmn divided by the time that the transistor Qp is ON. In the following, it is assumed that the transistor Qp is turned on when the PWM signal Vpwmp goes from high to low, and that the transistor Qn is turned on when the PWM signal Vpwmn is goes from low to high.

In addition, the ON times of the transistors Qp, Qn can be offset or adjusted as needed in order to prevent both of them from being instantly turned on and shorting the power supply Tvdd and ground Tvss terminals.

Also, the inductor Lout and capacitor Cout shown in FIG. 1 are connected between the output terminal Tout and the ground terminal Tvss of the semiconductor integrated circuit device 100. The final output voltage delivered to the load (Vout) is provided at the node connecting Cout and Lout, and applied to the load Z. The voltage difference between the voltage Vsw, which is outputted at the switching part 7, and the final output voltage Vout, is the voltage across the inductor Lout. Taking the side of the inductor Lout which faces the load Z as a reference, this voltage difference is the input voltage VDD minus the output voltage to the load (Vout) when the transistor Qp is on, and it is the ground voltage VSS minus the output voltage Vout when the transistor Qn is on. Consequently, the voltage across the inductor Lout alternates from positive to negative and a current IL flows in the inductor Lout. While the non-light-load mode is maintained, the current IL in the inductor rises while Qp is on and falls while Qp is off.

When the current IL flowing in the inductor Lout equals the current flowing in the load Z, there is no DC current flowing in the capacitor Cout and the output voltage Vout becomes steady-state.

For the DC-DC converter in FIG. 1 explained above, part or all of the circuit in the semiconductor integrated circuit device 100 may be generated using external components. For example, when a large current in the switching part 7 is desired, one can adopt a scheme in which the switching part 7 is not contained within the semiconductor integrated circuit device 100 and discrete external components are instead used to form the switching part. Alternatively, the inductor Lout and capacitor Cout can be included in the semiconductor integrated circuit device.

In the following we briefly describe how the DC-DC converter operates. When the current flowing in the load Z is small, excessive current flows to the capacitor Cout. The resulting output voltage provided to the load (Vout) exceeds the desired voltage for the load, and the feedback voltage Vfb rises. Consequently, the error signal Verr falls. This decreases the duty ratio of the PWM signal Vpwmp and the period when the transistor Qp is on becomes shorter. As a consequence, the output voltage Vout is lowered and is stabilized at the desired voltage.

On the other hand, as the current flowing in the load Z becomes larger, not enough current flows from the capacitor Cout. Therefore, the output voltage provided to the load (Vout) falls below the desired voltage and is reflected by the feedback voltage Vfb dropping. Consequently, the error signal Verr rises. This increases the duty ratio of the PWM signal Vpwmp and the ON period of the transistor Qp becomes longer. As a result, the output voltage Vout rises and stabilizes at the desired value. Due to the feedback, the DC-DC converter can generate a prescribed output voltage Vout even when the load Z varies slightly.

Figure 6:
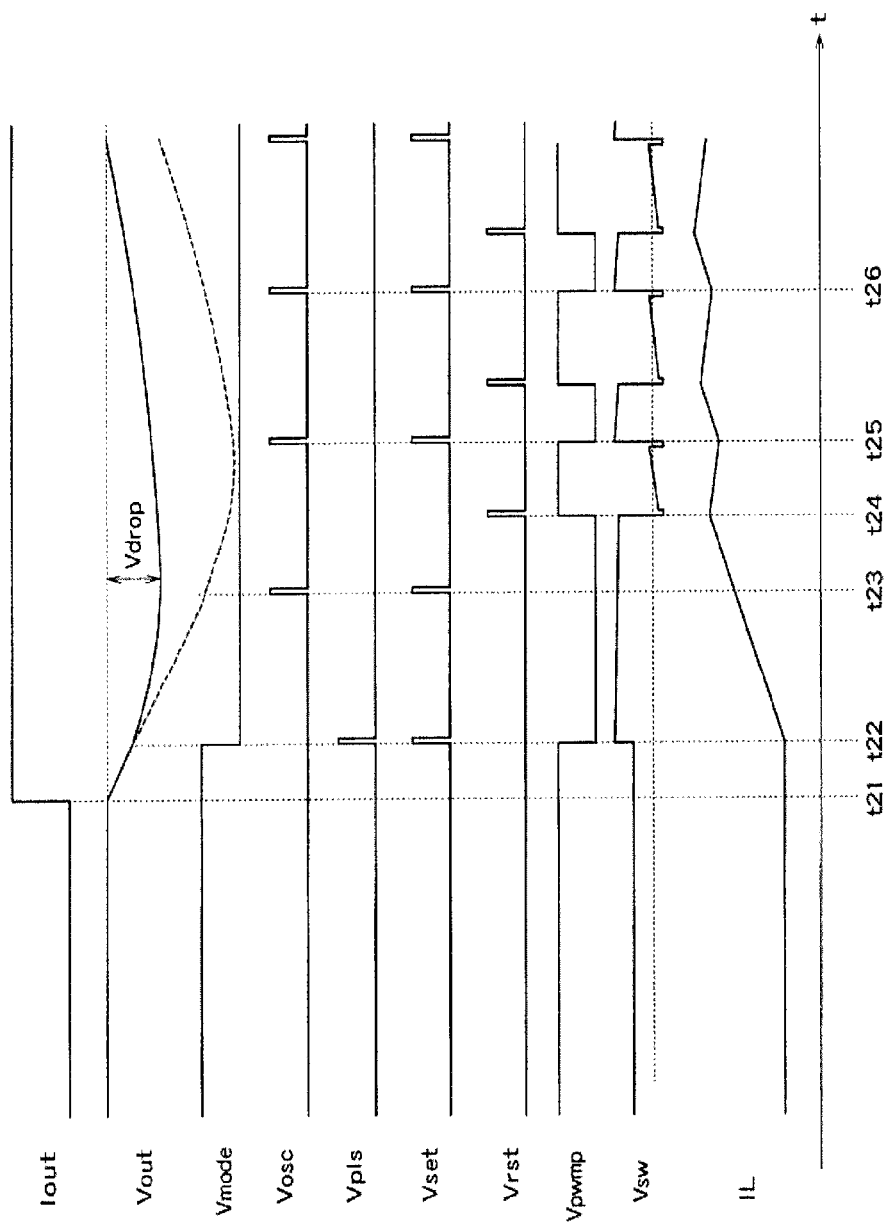
FIG. 6 is a waveform diagram illustrating in detail the operation of the DC-DC converter shown in FIG. 1.

FIG. 6 is a waveform diagram illustrating in detail the operation of the DC-DC converter shown in FIG. 1. Here, the x-axis represents the time and the y-axis represents the following circuit variables, listed in order of depiction: the current Iout flowing in the load Z, the final output voltage Vout applied to the load Z, the mode signal Vmode, the oscillating signal Vosc, the pulse signal Vpls, the set signal Vset, the reset signal Vrst, the PWM signal Vpwmp for transistor Qp, the voltage Vsw at the output of the semiconductor integrated circuit device 100, and the current IL flowing in the inductor Lout.

Suppose the current Iout flowing in the load Z is low until time t21. In this case, because the feedback voltage Vfb is higher than the reference voltage Vref1, the mode setting part 3 sets the mode signal Vmode high (light-load mode). In the following explanation we refer to FIG. 2. Because the switches SW42 and SW43 in the oscillation signal generating part 4 are turned off, so are the current source 141 and the comparator A46. Also, due to the inverter 62 and the AND circuit 64 shown in FIG. 1, the set signal Vset is fixed low and the PWM signals Vpwmp, Vpwmn are fixed high and low, respectively. The transistors Qp, Qn in the switching part 7 are consequently turned off. Therefore, in the light-load mode the various parts in the semiconductor integrated circuit device 100 are turned off and no current flows in transistors Qp, Qn, cutting power consumption.

At time t21, the current Iout flowing in the load Z rises, so that the output voltage Vout starts to drop. This is accompanied by a drop in the feedback voltage Vfb, and its difference from the reference voltage Vref1 becomes larger. Then at time t22, the mode setting part 3 sets the mode signal Vmode low (non-light-load mode).

Even when in the non-light-load mode, it takes some time for the oscillation signal generating part 4 to generate the oscillation signal Vosc. This is because the following fact: As shown in FIGS. 2 and 3, after the switch SW42 is turned on the capacitor C45 charges up, and the oscillation signal Vosc cannot be set high until the voltage Vp rises above the reference voltage Vref3. Consequently, the oscillation signal Vosc can be set high only at some time t23 later than the time t22 shown in FIG. 6.

On the other hand, as explained with reference to FIG. 4 and FIG. 5, when the mode signal Vmode switches from high to low, little time is required for the pulse generating part 5 to set the pulse signal Vpls high. Consequently, by means of the inverter 62, the OR circuit 63 and the AND circuit 64 shown in FIG. 1, the set signal Vset rises at the time t22 shown in FIG. 6. The rise of Vset triggers a rise in the output signal Q of the RS flip-flop circuit 61, which in turn triggers the control part 6 to set the PWM signal Vpwmp low.

Consequently, immediately after the time t22 when the output voltage Vout starts to drop, the transistor Qp shown in FIG. 1 is turned on and the voltage Vsw is set at the input voltage VDD. This makes it possible to prevent the current IL in the inductor Lout from increasing and to prevent the output voltage Vout from falling.

When the current IL rises and the output of the adder 67 becomes equal to the error signal Verr at time t24, the comparator 68 increases the reset signal Vrst. Simultaneously, the control part 6 sets the PWM signal Vpwmp high and transistor Qp turns off. In this case, because there is no drastic change in the current IL flowing in the inductor Lout, a current flows from the ground terminal Tvss to the inductor Lout via a parasitic diode (not shown in the figure) of the transistor Qn. The voltage Vsw consequently becomes negative immediately after the time t24 when through current must be prevented.

After time t22, the DC-DC converter is in the non-light-load mode and periodically (at times t23, t25, t26, etc.), the oscillation signal generating part 4 sets the oscillation signal Vosc high. At each rising edge of the oscillating signal Vosc, the control part 6 is triggered to toggle the PWM signal Vpwmp from high to low, causing transistor Qp to turn on. In this way, the output voltage Vout is reestablished at the original voltage level that existed prior to time t21.

The following discussion will compare an alternative circuit which does not incorporate certain features of the present disclosure. This comparison is provided to describe the functionality provide by the features of this disclosure.

Suppose, in the circuit which lacks certain features of the present disclosure, that the pulse generating part 5 is not configured and no pulse Vpls is generated. Consequently, the set signal Vset will go high at time t23. In this case, as indicated by the broken line in FIG. 6, the output voltage Vout keeps decreasing significantly until the time point t23.

On the other hand, according to the present embodiment, when switching of the mode signal Vmode from high (light-load mode) to low (non-light-load mode), the pulse generating part 5 is triggered to generate the pulse signal Vpls. Then, the rising pulse signal Vpls triggers the RS flip-flop circuit 61 and the PWM signal generating part 6A act to turn on the transistor Qp in the switching part 7. Consequently, even when the current flowing in the load Z increases, it is still possible to quickly start feeding electric power to the load Z and suppress the drop Vdrop in the output voltage Vout.

As a result, according to the present embodiment, when the pulse generating part 5 is triggered and moves from low to high, the current flowing in the load Z rises, so that the set signal Vset can quickly be set high. This enables the DC-DC converter to supply a steady output voltage to the load Z.

The DC-DC converter shown in FIG. 1 is merely an example. Various modifications can be adopted. For example, one can also adopt a scheme in which at least a portion of the MOS transistors are made from bipolar transistors and other semiconductor elements. Also, one can adopt a scheme in which the electroconductive type of the transistor is inverted, and, corresponding to this inversion, the polarity of the input signal of the transistors is inverted to form the DC-DC converter circuit. For example, instead of the PMOS transistor Qp shown in FIG. 1, one could use an NMOS transistor. In this case the basic operating principle is the same as mentioned previously.

The DC-DC converter according to the present embodiment may have its entire circuit formed on a single semiconductor substrate, or have a portion of the circuit formed on another semiconductor substrate. Also, the DC-DC converter can be formed by assembling discrete components on a printed circuit board.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor integrated circuit device for use in a DC-DC converter configured to switch a voltage fed to a load in accordance with a pulse width modulation (PWM) signal, the device comprising:
   an error voltage generating part configured to generate an error voltage based on a difference between a feedback voltage and a preset reference voltage, the feedback voltage corresponding to an output voltage;
   a mode setting part configured to set an operating mode of the device to a light-load mode or a non-light-load mode by outputting a mode signal indicative of the mode, the setting done based on the error voltage;
   an oscillation signal generating part configured to generate an oscillation signal when the device is in the non-light-load mode, and configured to turn off the oscillation signal when the device is in the light-load mode, the oscillation signal having a fixed period;
   a pulse generating part configured to generate a pulse signal before the oscillation signal generating part starts generating the oscillation signal, wherein generating the pulse signal is triggered by a switch from the light-load mode to the non-light-load mode; and
   a control part configured to turn the PWM signal off when the oscillation signal and the pulse signal are not generated, and to turn on the PWM signal upon occurrence of the pulse signal at a first time and upon occurrence of a transition of the oscillation signal at a second time, the PWM signal having a duty ratio based on the error voltage.

2. The semiconductor integrated circuit device of claim 1, wherein the pulse generating part comprises:
   a first inverter configured to generate a first signal by inverting the mode signal;
   a delay circuit configured to generate a second signal by delaying the first signal;
   a second inverter configured to generate a third signal by inverting the second signal; and
   an AND circuit configured to generate the pulse signal by performing an AND operation involving the first signal and the third signal as inputs.

3. A semiconductor integrated circuit device, which is used in a DC-DC converter configured to switch a voltage for the load in accordance with a pulse width modulation (PWM) signal, the semiconductor integrated circuit device comprising:
   an error voltage generating part configured to generate an error voltage based on a difference between a feedback voltage and a preset reference voltage, the feedback voltage correlated with an output voltage;
   a mode setting part configured to set an operating mode of the device to a light-load mode or a non-light-load mode by outputting a mode signal indicative of the mode, the setting being based on the error voltage;
   an oscillating signal generating part configured to generate an oscillating signal when the device is in the non-light-load mode, and to turn off the oscillating signal when operating in the light-load mode, the oscillating signal having a prescribed period;
   a pulse generating part configured to generate a pulse signal before the oscillating signal generating part starts generating the oscillating signal, the pulse signal generation being triggered by a switch from the light-load mode to the non-light-load mode; and
   a control part configured to control the PWM signal based on the error voltage, the oscillating signal, and the pulse signal.

4. The semiconductor integrated circuit device of claim 3, wherein the mode setting part is further configured to set the mode of the device such that the mode will be correlated with load current.

5. The semiconductor integrated circuit device of claim 4, wherein the mode setting part is further configured to set the operating mode of the device such that transitions from light-load mode to non-light-load mode occur when load current rises.

6. The semiconductor integrated circuit device of claim 5, wherein the control part is configured to turn the PWM signal off when the oscillating signal and the pulse signal are not generated, and to turn on the PWM signal, turning on the PWM signal upon occurrence of the pulse signal at a first time and upon occurrence of a transition of the oscillation signal at a second time, wherein the PWM signal has a duty ratio based on the error voltage.

7. The semiconductor integrated circuit device of claim 6, wherein the control part is further configured to initially generate the PWM signal upon a switch from the light-load mode to the non-light-load mode, the initial generating being triggered by the pulse signal, and to generate a complement PWM signal when triggered by a transition of the oscillation signal.

8. The semiconductor integrated circuit device of claim 7, wherein generating the complement PWM signal comprises changing the complement PWM signal from a high voltage to a low voltage when the PWM signal transitions from a low voltage to a high voltage.

9. The semiconductor integrated circuit device of claim 8, wherein the integrated circuit device is configured to consume less power in the light-load mode than in the non-light load mode.

10. The semiconductor integrated circuit device of claim 9, the device further comprising a switching part, wherein the switching part comprises a first transistor having the PWM signal applied at its gate, and a second transistor having the complement PWM signal applied at its gate.

11. The semiconductor integrated circuit device of claim 10,
   wherein both the first and second transistor remain off when the device is in the light-load mode, and
   wherein the first transistor is configured to be initially turned on in non-light load mode.

12. The semiconductor integrated circuit device of claim 11, wherein the first transistor is further configured to alternately turn off and turn on after being initially turned on and while the device remains in the non-light-load mode, the subsequent turning off and turning on being based on the output voltage provided to the load.

13. The semiconductor integrated circuit device of claim 12, wherein the first transistor is a PMOS transistor and the second transistor is an NMOS transistor.

14. The semiconductor integrated circuit device of claim 13, wherein the pulse generating part comprises:
- a first inverter configured to generate a first signal by inverting the mode signal;
- a delay circuit configured to generate a second signal by delaying the first signal;
- a second inverter configured to generate a third signal by inverting the second signal; and
- an AND circuit configured to generate the pulse signal by performing an AND operation involving the first and third signals as inputs.

15. The semiconductor integrated circuit device of claim 14, further comprising: a switching part configured to switch the voltage fed to the load based on the PWM signal.

16. The semiconductor integrated circuit device of claim 15, wherein:
- an inductor is connected to a capacitor between the output terminal of the semiconductor integrated circuit device and the ground terminal; and
- the output voltage to the load is provided at the node at which the inductor and the capacitor are connected.

17. The semiconductor integrated circuit device of claim 16, wherein the control part comprises:
- a flip-flop circuit;
- an inverter configured to invert the mode signal;
- a wave generating part configured to generate a wave signal having a period equal to the period of the oscillating signal; and
- a current detecting part configured to generate a voltage correlated with a current flowing in the inductor.

18. The semiconductor integrated circuit device of claim 17, further comprising: a phase compensating part, the phase compensating part comprising a resistor and capacitor connected in series, both the resistor and capacitor connected between an output terminal of the error voltage generating part and ground.

19. The semiconductor integrated circuit device of claim 18, wherein the feedback voltage is voltage divided by multiple resistors in series prior to being inputted to the error voltage generating part.

20. A voltage conversion method, wherein an output voltage fed to the load is switched according to a PWM signal, the method comprising the steps of:
- generating an error voltage based on a difference between a feedback voltage and a preset reference voltage, the feedback voltage being based on the output voltage;
- setting an operating mode as light-load or non-light-load depending on the error voltage;
- generating an oscillating signal with a prescribed period when operating in the non-light-load mode, and turning the oscillating signal off when operating in the light-load mode;
- generating a pulse signal before generating the oscillation signal commences, the pulse signal being triggered when the operation mode switches from the light-load mode to the non-light-load mode;
- controlling the PWM signal based on the error voltage, the oscillation signal, and the pulse signal; and
- switching the voltage fed to the load in accordance with the PWM signal.

* * * * *